(12) United States Patent
Kanematsu

(10) Patent No.: US 8,238,664 B2
(45) Date of Patent: Aug. 7, 2012

(54) IMAGE PROCESSING APPARATUS, CONTROL METHOD THEREFOR, AND RECORDING MEDIUM

(75) Inventor: Shinichi Kanematsu, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 855 days.

(21) Appl. No.: 12/376,570

(22) PCT Filed: Dec. 8, 2008

(86) PCT No.: PCT/JP2008/072718
§ 371 (c)(1),
(2), (4) Date: Feb. 5, 2009

(87) PCT Pub. No.: WO2009/096099
PCT Pub. Date: Aug. 6, 2009

(65) Prior Publication Data
US 2010/0177965 A1    Jul. 15, 2010

(30) Foreign Application Priority Data
Jan. 31, 2008    (JP) .................................. 2008-021646

(51) Int. Cl.
*G06K 9/18* (2006.01)
*G06K 9/03* (2006.01)

(52) U.S. Cl. ........................................ 382/182; 382/309

(58) Field of Classification Search .................. 382/181, 382/182, 190, 229, 309
See application file for complete search history.

(56) References Cited

U.S. PATENT DOCUMENTS 7,142,716 B2 * 11/2006 Katsuyama et al. .......... 382/190
7,162,086 B2 * 1/2007 Ikeda ............................ 382/182
7,689,025 B2 * 3/2010 Takiguchi .................... 382/139
2002/0012468 A1 * 1/2002 Togashi et al. .............. 382/229

FOREIGN PATENT DOCUMENTS

| JP | 2-206895 | 8/1990 |
| JP | 6-266888 | 9/1994 |
| JP | 8-305802 | 11/1996 |
| JP | 10-124615 | 5/1998 |
| JP | 2000-339402 | 12/2000 |
| JP | 2004-46315 | 2/2004 |
| JP | 2006-134088 | 5/2006 |

OTHER PUBLICATIONS

International Search Report, dated Oct. 2, 2009, in PCT/JP2008/072718.

* cited by examiner

*Primary Examiner* — Daniel Mariam
(74) *Attorney, Agent, or Firm* — Fitzpatrick, Cella, Harper & Scinto

(57) ABSTRACT

Even if an image processing apparatus which can recognize a certain character string is available on the network, processing results of an OCR process are determined by character recognition ability of an image processing apparatus which has happened to perform the OCR process. Thus, after an MFP performs a character recognition process based on image data contained in a character region of an image, if it is determined that processing results of the character recognition process are highly likely to contain recognition errors, the processing results are output to another MFP together with first information which indicates a high likelihood of the processing results containing recognition errors. Upon acquiring the processing results, the other MFP with higher character recognition capabilities performs a character recognition process on the image data contained in the character region if the first information is attached.

7 Claims, 17 Drawing Sheets

F I G. 12
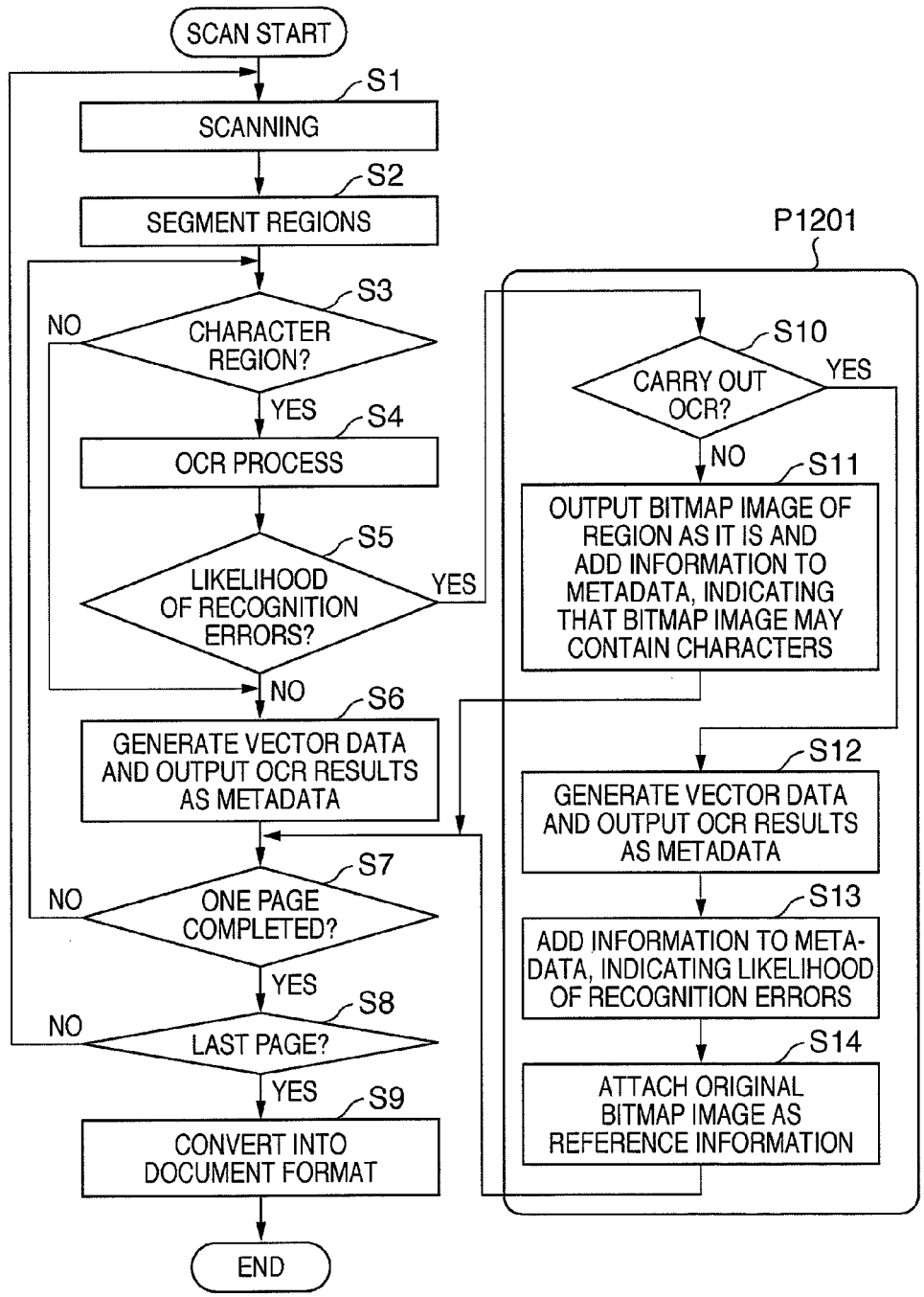

IMAGE PROCESSING APPARATUS, CONTROL METHOD THEREFOR, AND RECORDING MEDIUM

TECHNICAL FIELD

The present invention relates to an image processing apparatus which performs a character recognition process on an image, a control method therefor, and a recording medium.

BACKGROUND ART

There is a demand to connect a large number of image processing apparatuses (printers, scanners, digital copiers, facsimile machines, and the like) via a network, operate the image processing apparatuses in a coordinated fashion, and thereby implement more advanced functionality. For that, it is proposed to convert (vectorize) image data exchanged among image processing apparatuses into resolution-independent image data format (resolution-independent data: vector data). The image processing apparatuses which receive the vector data convert (rasterize) the vector data into a bitmap image. Thus there is no image degradation due to resolution conversion. This makes it possible to generate bitmap images suitable for each image processing apparatus and thereby obtain high-definition images. In particular, this provides an important technique for mutually linking various image processing apparatuses which have different capabilities.

Also, it is proposed to manage information (metadata) which is not printed, as additional information on vectorized image data. The metadata, which contains information about image data, is intended to provide tips on image processing or keywords for use in image searches, and so on.

Furthermore, it is also proposed to perform an OCR process (optical character recognition process) on a bitmap image read from an original by a scanning apparatus and adds character codes obtained as OCR process results to image data, in the form of metadata so as to be used as image search information.

Besides, if the input image data is stored as a file in a secondary storage device of the image processing apparatus, a user can retrieve and output the image data repeatedly whenever desired. A feature which allows image data to be stored as a file in a secondary storage device of an image processing apparatus for the purposes of reuse of the image data is referred to as a box feature and a file system used for this is referred to as a box. The fox feature allows the user to repeatedly reuse image data once generated such as printing stored image data again or delivering the image data to an image processing apparatus with different capabilities. When large amounts of image data are stored in a distributed manner in such boxes installed on a large number of image processing apparatus connected via a network, it will be convenient if the image data can be searched. Conceivable search methods include a method which adds OCR process results (such as described above) in the form of metadata to image data in advance, searches for the metadata, and thereby finds desired image data quickly and easily. However, optical character recognition by the OCR process may have a high recognition errors rate depending on languages supported by OCR functions of the image processing apparatus as well as on OCR performance of the image processing apparatus, and the like. Therefore, a technique has been proposed which stores a region of an input bitmap image as it is without using an OCR process if it is likely that the OCR process will cause recognition errors in the given region (Japanese Patent Laid-Open No. 2000-339402).

However, with the conventional technique, even if a region is left in the form of a bitmap image because characters cannot be recognized correctly, another image processing apparatus with different OCR performance may be able to recognize characters correctly in the region. For example, copiers or printers of the same model are shipped to various language regions and their OCR functions support different languages. Thus, image processing apparatus intended for the English language may not be able to recognize characters correctly in an image containing Japanese characters. In that case, it is highly likely that proper OCR process results can be obtained if the image is transferred to an image processing apparatus capable of Japanese character recognition, if such is available. Also, if character size of an original is extremely small or characters are blurred, it is likely that an apparatus which has an OCR function with higher character recognition ability can recognize the characters more appropriately.

In this way, with the conventional technique, even if an image processing apparatus which can recognize a certain character string is available on the network, processing results of an OCR process are determined by the character recognition ability of an image processing apparatus which has happened to perform the OCR process. Consequently, even if another image processing apparatus has an OCR function with higher character recognition ability, it is not possible to make full use of the ability.

DISCLOSURE OF INVENTION

The present invention enables realization of a technique in which when results of a character recognition process performed by one image processing apparatus are likely to contain recognition errors, a character recognition process can be performed by another image processing apparatus with higher character recognition ability.

According to one aspect of the present invention, there is provided an image processing apparatus comprising: a character recognition unit configured to perform a character recognition process on a character region contained in an image; a receiving unit configured to receive an image containing a character region and processing results of a character recognition process performed on the character region from an external apparatus; a determination unit configured to determine, based on the received processing results, whether a character recognition process needs to be performed on the character region of the received image using the character recognition unit; and a control unit configured to make the character recognition unit perform a character recognition process on the character region of the received image if the determination unit determines that a character recognition process needs to be performed on the character region of the received image using the character recognition unit.

According to another aspect of the present invention, there is provided a control method for an image processing apparatus, comprising: performing, by a character recognition unit, a character recognition process on a character region contained in an image; receiving an image containing a character region and processing results of a character recognition process performed on the character region from an external apparatus; determining, based on the received processing results, whether a character recognition process needs to be performed on the character region of the received image using the character recognition unit; and making the character recognition unit perform a character recognition process on the character region of the received image if it is determined that a character recognition process needs to be performed on the character region of the received image using the character recognition unit.

Further features of the present invention will be apparent from the following description of exemplary embodiments with reference to the attached drawings.

BRIEF DESCRIPTION OF DRAWINGS

FIG. 12 is a flowchart illustrating the process of reading an original, performing an OCR process, and generating a document using the image processing apparatus according to the present embodiment;

BEST MODE FOR CARRYING OUT THE INVENTION

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

<Configuration of Image Processing Apparatus>

A configuration of a 1D color multi-functional peripheral to which the present embodiment is suitably applied will be described with reference to the FIG. 1.

Figure 1:
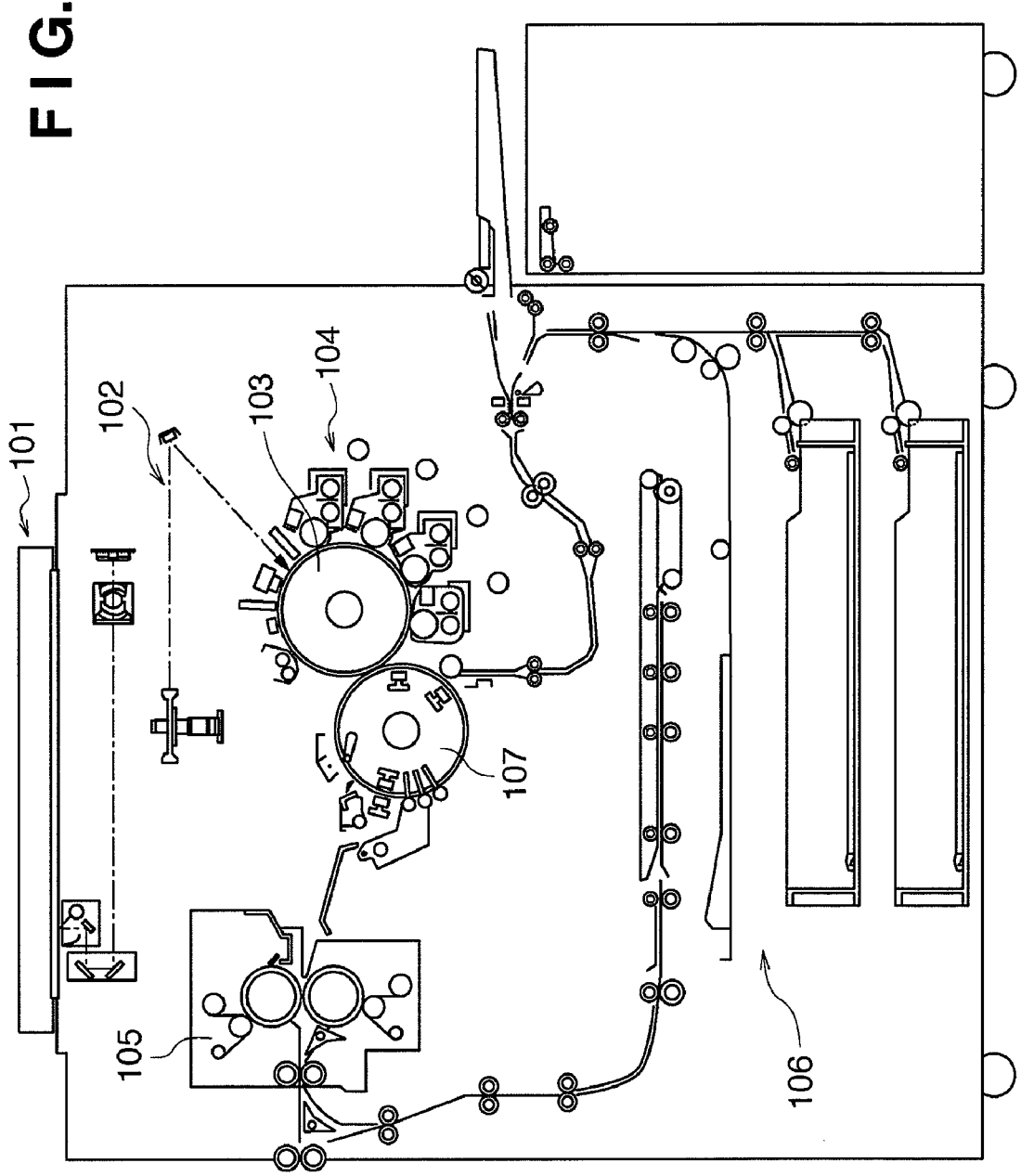
FIG. 1 is a diagram showing a configuration of an image processing apparatus (multi-functional peripheral) according to the present embodiment.

FIG. 1 is a diagram showing a configuration of an image processing apparatus (multi-functional peripheral) according to the present embodiment.

The image processing apparatus includes a scanning unit 101, laser exposure unit 102, image-creating unit 104, fixing unit 105, and paper feed/transport unit 106, where the image-creating unit 104 is equipped with a photosensitive drum 103. These components are controlled by a printer control unit (not shown).

The scanning unit 101 illuminates an original placed on document glass with light from a light source, optically reads an image from the original, converts the image into an electrical signal, and thereby creates image data. The laser exposure unit 102 directs a light beam, such as a laser beam, modulated according to the image data at a polygon mirror rotating at a constant angular velocity and illuminates the photosensitive drum 103 with the light beam reflected from the polygon mirror and serving as a scanning beam. The image-creating unit 104 creates an image by repeating a sequence of electrophotographic processes: rotationally drives the photosensitive drum 103, charges the photosensitive drum 103 using a charger, develops a latent image formed on the photosensitive drum 103 by the laser exposure unit 102 into a toner image using toner, transfers the toner image to a sheet, and recovers fine toner particles remaining on the photosensitive drum 103 without being transferred. Then, the sheet twists about a given position of a transfer drum 107. While the sheet wound in place around a transfer belt makes four rotations, developing units (developing stations) containing magenta (M), cyan (C), yellow (Y), and black (K) toners, respectively, perform the sequence of electrophotographic processes in turns. A full four-color toner image is transferred to the sheet through the four rotations. Then, leaving the transfer drum 107, the sheet is transported to the fixing unit 105.

The fixing unit 105 includes a combination of rollers and belts and contains a heat source such as a halogen heater. After the toner image is transferred to the sheet by the image-creating unit 104, the fixing unit 105 melts and fixes the toner on the sheet under heat and pressure.

The paper feed/transport unit 106 is equipped with one or more units of paper storage typified by a paper cassette or paper deck. On instructions from the printer control unit, the paper feed/transport unit 106 takes one of the sheets out of the paper storage and transports the sheet to the image-creating unit 104 and fixing unit 105. The sheet is wound around a transfer drum 107 of the image-creating unit 104. After four rotations, the sheet is transported to the fixing unit 105. During the four rotations, the Y, M, C, and K toner images are transferred to the sheet. To form images on both sides of the sheet, after passing through the fixing unit 105, the sheet is controlled so as to pass again through a transport path leading to the image-creating unit 104.

By communicating with a controller which controls the entire image processing apparatus, the printer control unit performs control based on instructions from the controller. Also, the printer control unit coordinates operation of the scanning unit, laser exposure unit, image-creating unit, fixing unit, and paper feed/transport unit by managing their conditions.

<System Configuration>

Figure 2:
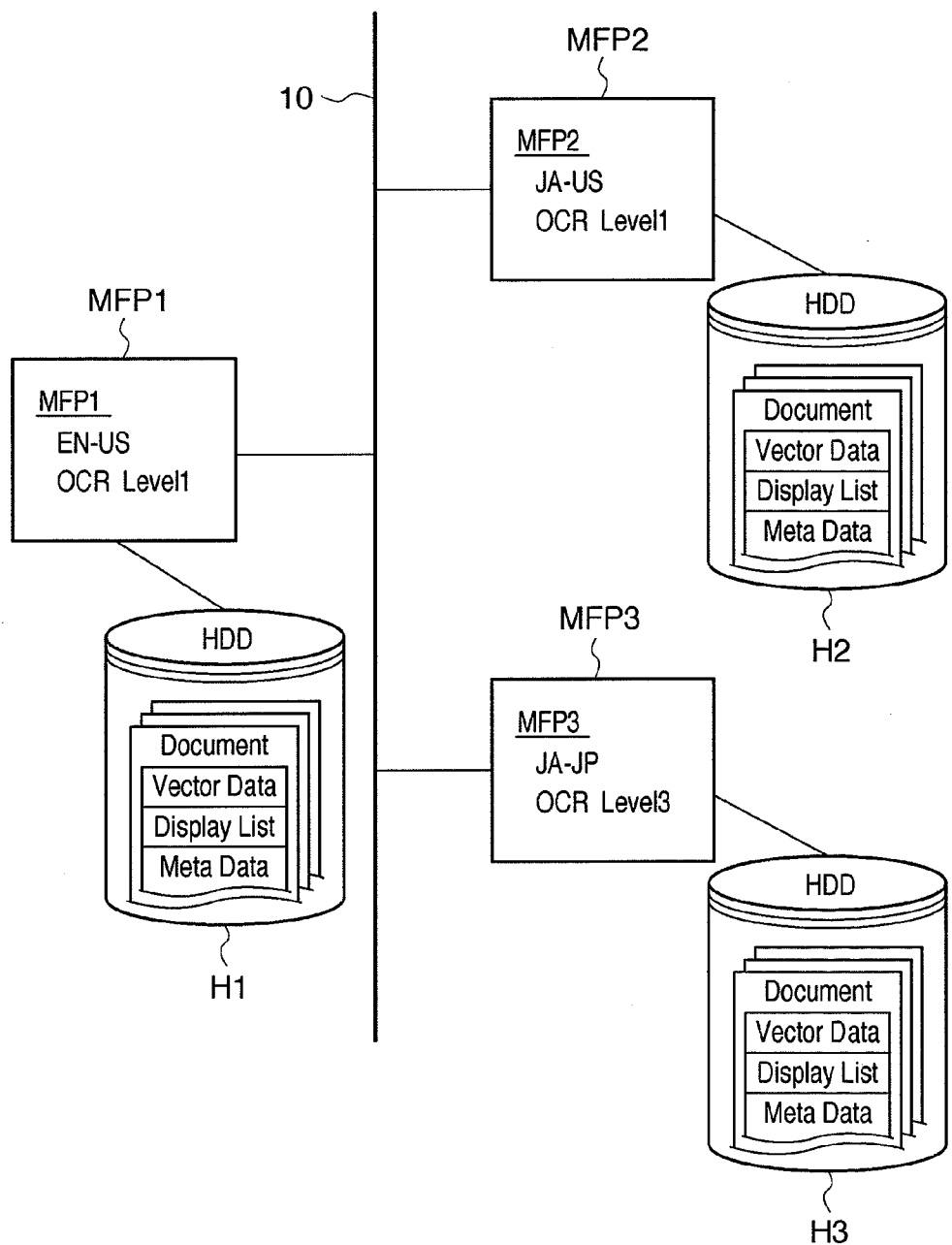
FIG. 2 is a block diagram showing an overall configuration of an image processing system according to the present embodiment.

FIG. 2 is a block diagram showing an overall configuration of an image processing system according to the present embodiment.

Referring to FIG. 2, the image processing system includes MFP1, MFP2, and MFP3 interconnected via a LAN (Local Area Network) 10 or the like. MFP1, MFP2, and MFP3 can communicate with one another using a network protocol. Incidentally, the MFPs connected to the LAN (network) 10 are not limited to the physical layout described above. Also, devices other than MFPs may be connected to the LAN 10 (including, for example, PCs, various servers, and printers). The MFPs have respective HDDs (hard disk drives: secondary storage devices) H1, H2, and H3.

Each MFP has language and destination settings as basic settings. MFP1 is intended for the English language (EN) and destined for North America (US), MFP2 is intended for the Japanese language (JA) and destined for North America (US), and MFP3 is intended for the Japanese language (JA) and destined for Japan (JP). Furthermore, the devices differ in character recognition ability of OCR software. MFP1 and MFP2 have equal OCR performance (Level 1), but MFP3 has higher OCR performance (Level 3). In this way, image processing apparatus which differ in specifications, language, and ability are connected via the LAN 10 and configured to be able to exchange documents, print documents on a printer, and save documents in a box.

<Description of Controller>

Figure 3:
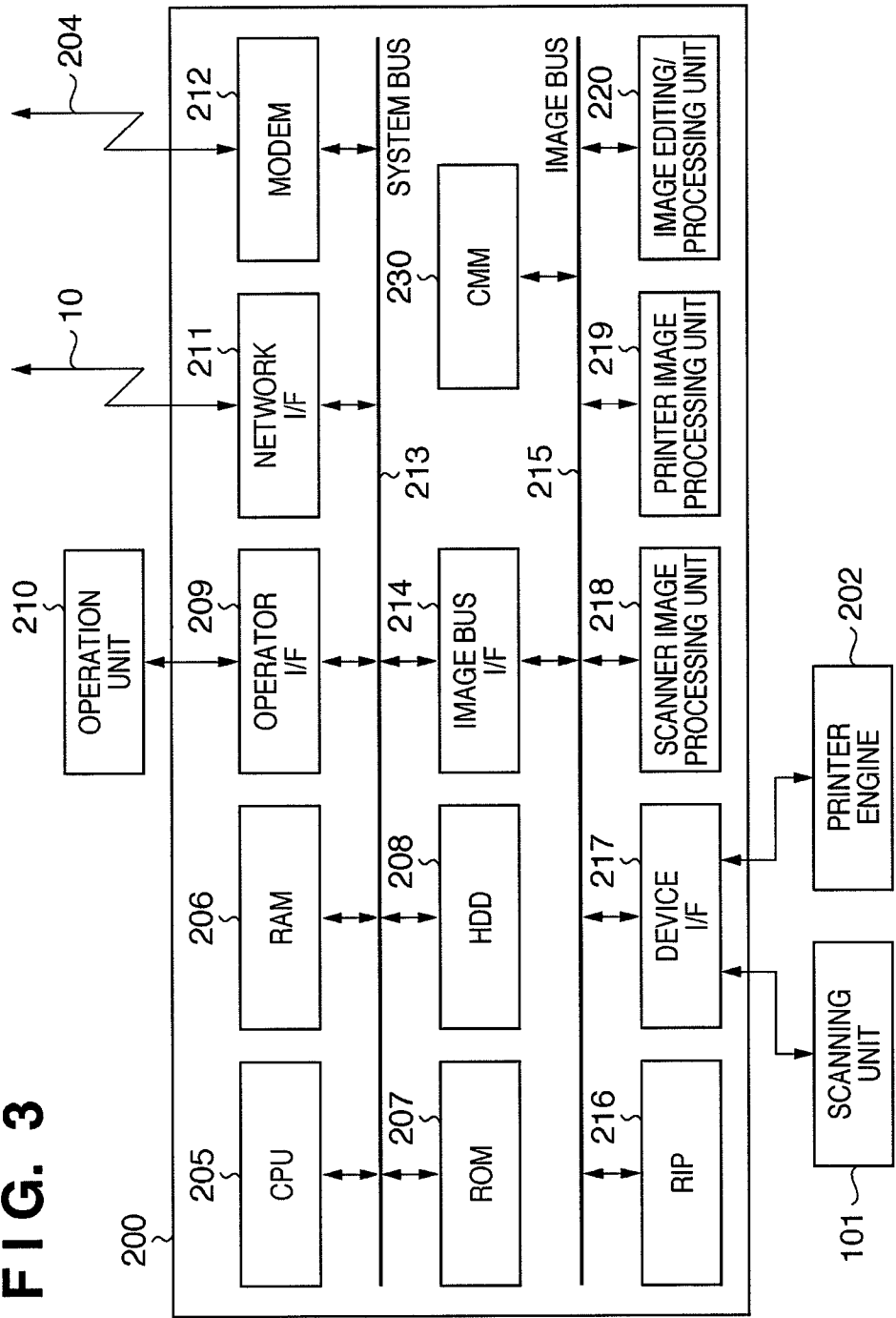
FIG. 3 is a block diagram showing a configuration example of a controller of the image processing apparatus (multi-functional peripheral) according to the present embodiment.

FIG. 3 is a block diagram showing a configuration example of a controller of the image processing apparatus (multi-functional peripheral) according to the present embodiment.

Referring to FIG. 3, the controller 200 controls the process of reading and printing out image data by being connected with the scanning unit 101 which is an image input device and a printer engine 202 which is an image output device. Also, by being connected to the LAN 10 or a public network 204, the controller 200 controls input/output of image information and device information via the LAN 10.

A CPU 205, that is, a central processing unit, controls the entire MFP. A RAM 206, into which a program to be performed by the CPU 205 is loaded, provides working memory for operation of the CPU 205. Also, the RAM 206 provides image memory to temporarily store inputted image data. A ROM 207 is a boot ROM which stores a boot program of the system. The HDD 208, that is, a hard disk drive, stores system software for various types of processing as well as input image data and the like. An operator interface 209, which interfaces with an operation unit 210 equipped with a display screen capable of displaying image data and the like, outputs display data to the operation unit 210. Also, the operator interface 209 provides a user interface device which allows the user (operator) to enter various commands and conveys the information entered by the user via the operation unit 210 to the CPU 205. A network interface 211, which is implemented, for example, by a LAN card, connects to the LAN 10 to control input/output of various types of information from/to external devices. A modem 212 connects to the public network 204 and controls input/output of image information from/to external devices. The units described above are arranged on a system bus 213.

The image bus interface 214 interfaces the system bus 213 with an image bus 215 that transfers image data at high speed and provides a bus bridge used to convert data structure. The image bus 215 is connected with such devices as a raster image processor (RIP) 216, device interface 217, scanner image processing unit 218, printer image processing unit 219, image editing/processing unit 220, and color management module (CMM) 230. The raster image processor (RIP) 216 converts page-description language (PDL) code and vector data (described later) into image data. The device interface 217 connects the scanner 101 and printer engine 202 to the controller 200 and performs synchronous/asynchronous conversion of image data.

The scanner image processing unit 218 performs various types of processing including correction, manipulation, and editing on image data input from the scanning unit 101. The printer image processing unit 219 performs correction, resolution conversion, and the like appropriate for the printer engine 202 on image data to be printed. The image editing/processing unit 220 performs various types of image processing including rotation and compression/decompression of image data. The CMM 230 is a special-purpose hardware module which performs color conversion (color space conversion) of image data based on profiles and calibration data. The profiles are functions or other information which are used to convert color image data expressed in a device-dependent color space into a device-independent color space (such as Lab). The calibration data is used to modify color reproduction characteristics of the scanning unit 101 or printer engine 202 of a multi-function peripheral.

<Software Configuration>

Figure 4:
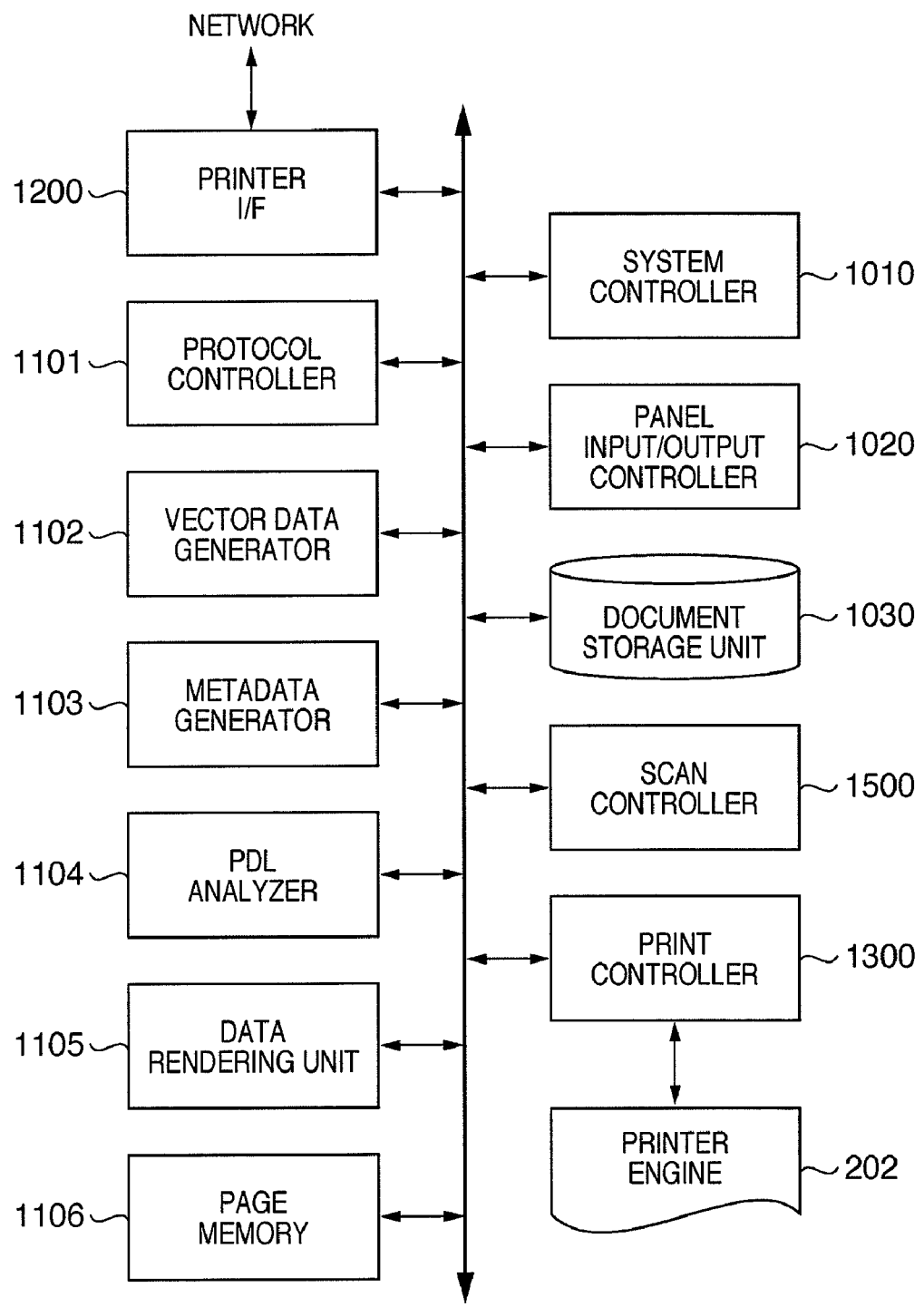
FIG. 4 is a block diagram showing a configuration of software which controls operation of the image processing apparatus according to the present embodiment.

FIG. 4 is a block diagram showing a configuration of software which controls operation of the image processing apparatus according to the present embodiment.

A printer interface 1200 is an interface which controls input and output from/to the LAN 10. A protocol controller 1101 controls communications with external devices by analyzing and transmitting a network protocol. A vector data generator 1102 generates vector data which is resolution-independent rendering description from a bitmap image (i.e., vectorizes the bitmap image). A metadata generator 1103 generates metadata which is secondary information obtained in the process of vectorization performed by the vector data generator 1102. The metadata provides additional information which is used for searches, but not for a rendering process. An index of throughput needed to render the vector data is also generated as metadata. A PDL analyzer 1104 analyzes PDL data and converts the PDL data into more manageable, intermediate code (DisplayList). The intermediate code generated by the PDL analyzer 1104 is passed to a data rendering unit 1105 for processing. The data rendering unit 1105 converts the intermediate code into bitmap data. The resulting bitmap data is stored in a page memory 1106 in sequence. The page memory 1106 is a volatile memory which temporarily stores bitmap data supplied from the data rendering unit 1105.

A panel input/output controller 1020 controls input and output to/from the operation unit 210. A document storage unit 1030, which is implemented by a secondary storage device such as a hard disk, stores data files which include vector data, display lists, and metadata in units of an input document (on a job-by-job basis). According to the present embodiment, the data files are referred to as "documents." A scan controller 1500 performs various types of processing including correction, manipulation, and editing on image data received from the scanning unit 101. A print controller 1300 converts contents of the page memory 1106 into a video signal and transfers the video signal to the printer engine 202. The printer engine 202 is a printing mechanism which forms visible images on recording paper (sheets) based on the received video signal. A system controller 1010 integrally controls the software modules described above and thereby controls and manages the entire image processing apparatus as a system. Furthermore, the system controller 1010 controls each operation such as a print operation or a scan operation as a job, and displays progress of job processing or status of the job on the operation unit 210 by controlling the panel input/output controller 1020.

<Data Processing by Controller 200>

Next description will be given of how vector data, a display list DL, and metadata of a document are generated.

Figure 5:
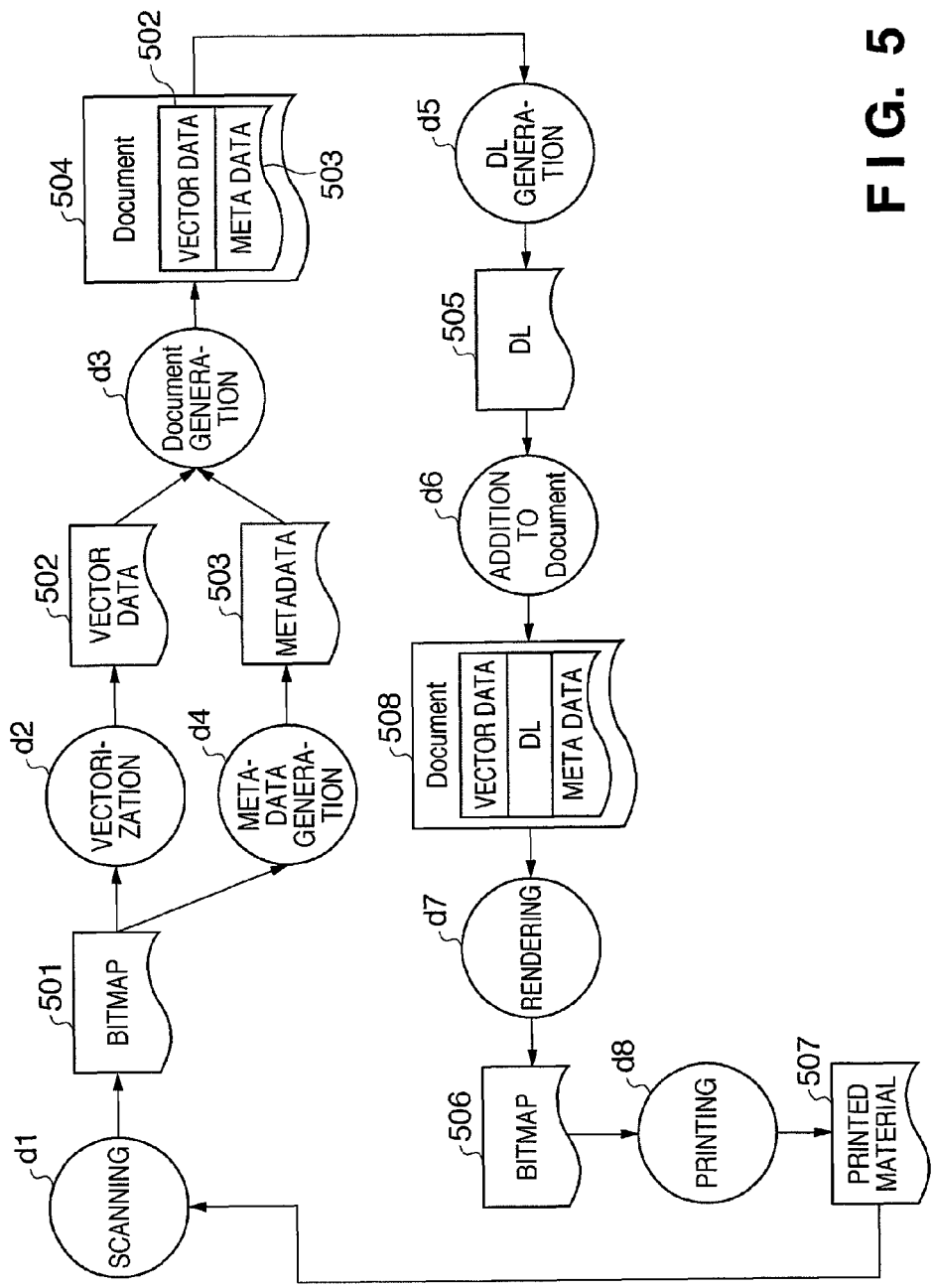
FIG. 5 is a diagram showing a data flow which takes place when a document is created based on data scanned from an original by a scanning unit and then the document is copied or saved in a box.
Figure 6:
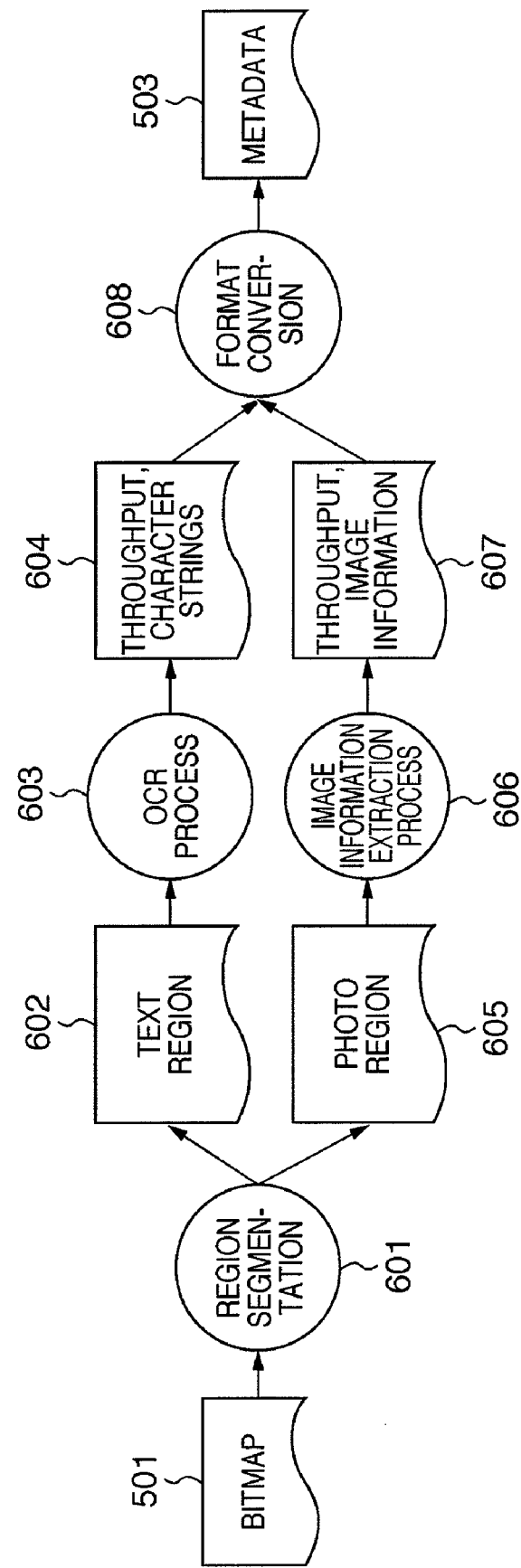
FIG. 6 is a diagram showing a concrete process flow of a metadata generation process d4 shown in FIG. 5.

FIGS. 5 and 6 are diagrams showing a data flow on the controller 200 according to the present embodiment.

FIG. 5 is a diagram showing a data flow which takes place when a document is created based on data scanned and read from an original by the scanning unit 101 and then the document is copied or saved in a box.

An image on an original placed on an original exposing unit is converted into bitmap data 501 in a scanning process d1. Then, in a vectorization process d2 and metadata generation process d4, vector data 502 and accompanying metadata (additional information) 503 both of which are resolution-independent are generated from the bitmap data 501. A concrete method for generating the vector data 502 and metadata 503 will be described later.

Next, in a document generation process d3, the vector data 502 and metadata 503 are associated with each other to generate a document 504. Next, in a DL generation process d5, a DL 505 is generated from vector data of the document 504. The DL 505 thus generated is added to the document (d6) to generate a document 508. The document 508 is sent to a rendering process d7 and converted into bitmap data 506. The bitmap data 506 is printed on a sheet in a printing process d8 to produce printed material 507. Incidentally, the printed material 507 can go through the scanning process d1 and subsequent processes again if placed on the original exposing unit again.

FIG. 6 is a diagram showing a concrete process flow of the metadata generation process d4 shown in FIG. 5.

First, in a region segmentation process 601, the bitmap data 501 goes through region segmentation. The region segmentation is a process which involves analyzing input bitmap image data, segmenting the bitmap image data into regions in units of an object block, identifying attributes of individual regions, and thereby classifying the regions. Available attributes include TEXT, PHOTO, LINE, PICTURE, and TABLE.

Figure 7:
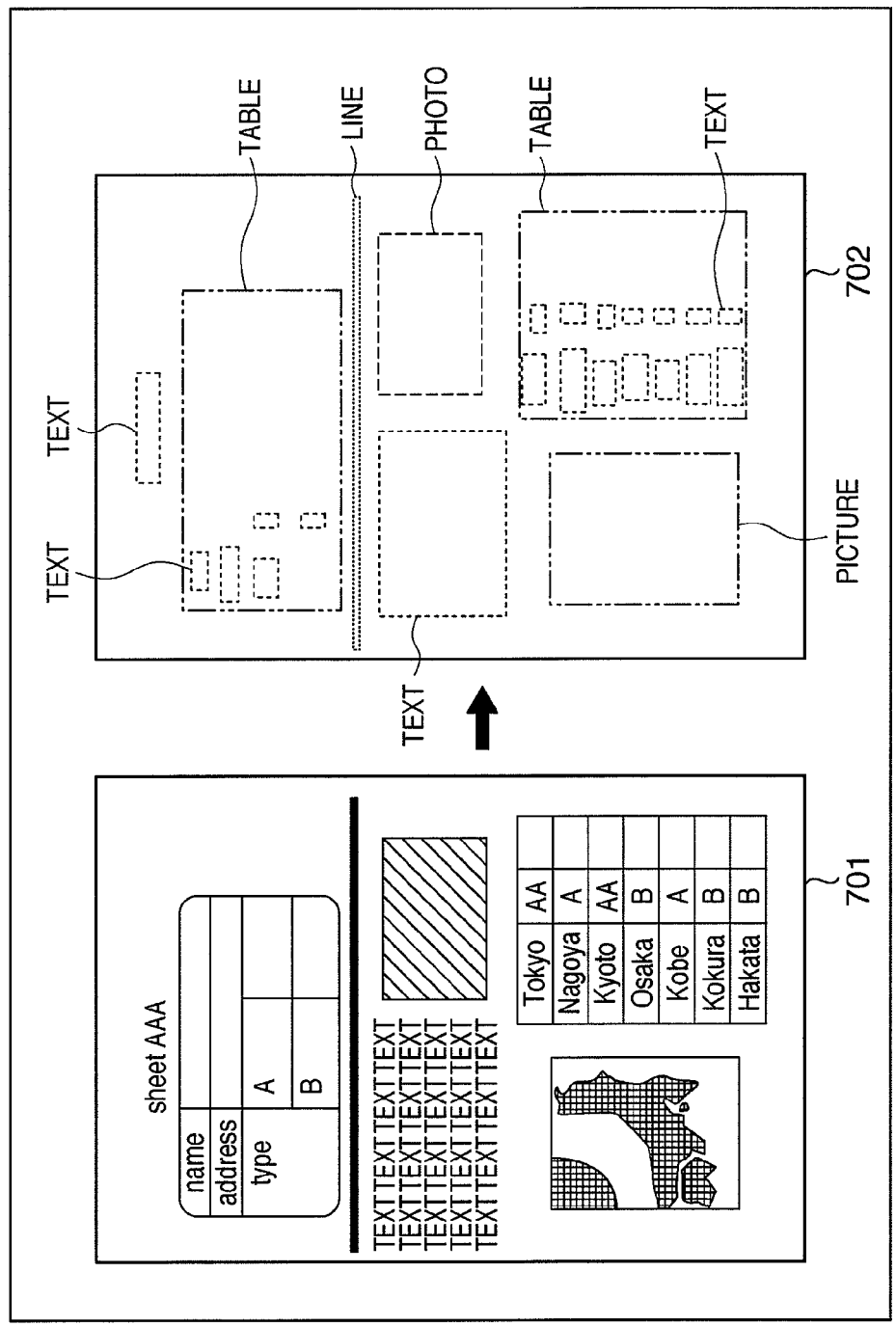
FIG. 7 is a diagram showing an example of region segmentation of an input image.

FIG. 7 is a diagram showing an example of region segmentation of an input image.

Results of region segmentation of an input image 701 are shown in 702. In 702, each dotted box represents one object unit produced as a result of image analysis and an attribute type attached to each object corresponds to a determination result of the region segmentation.

Returning to FIG. 6, among regions classified by attribute, image data identified as regions with a TEXT attribute (text region) 602 are converted into character strings 604 by an OCR process 603. That is, the character strings 604 are those printed on paper.

On the other hand, among the regions classified by attribute, a region with a PHOTO attribute (photo region) 605 is converted into image information 607 through an image information extraction process 606. The image information 607, which represents features of the photo, is given as a character string such as "flower" or "face." The image information can be extracted using a typical image processing technique such as detection of image feature values (frequency, density, and the like of pixels of the image) or face recognition. The character strings 604 and image information 607 thus generated and their throughput indices are converted into a data format described later, by a format conversion process 608 to generate the metadata 503.

<Structure of Document Data>

Next, a structure of a document will be described.

Figure 8:
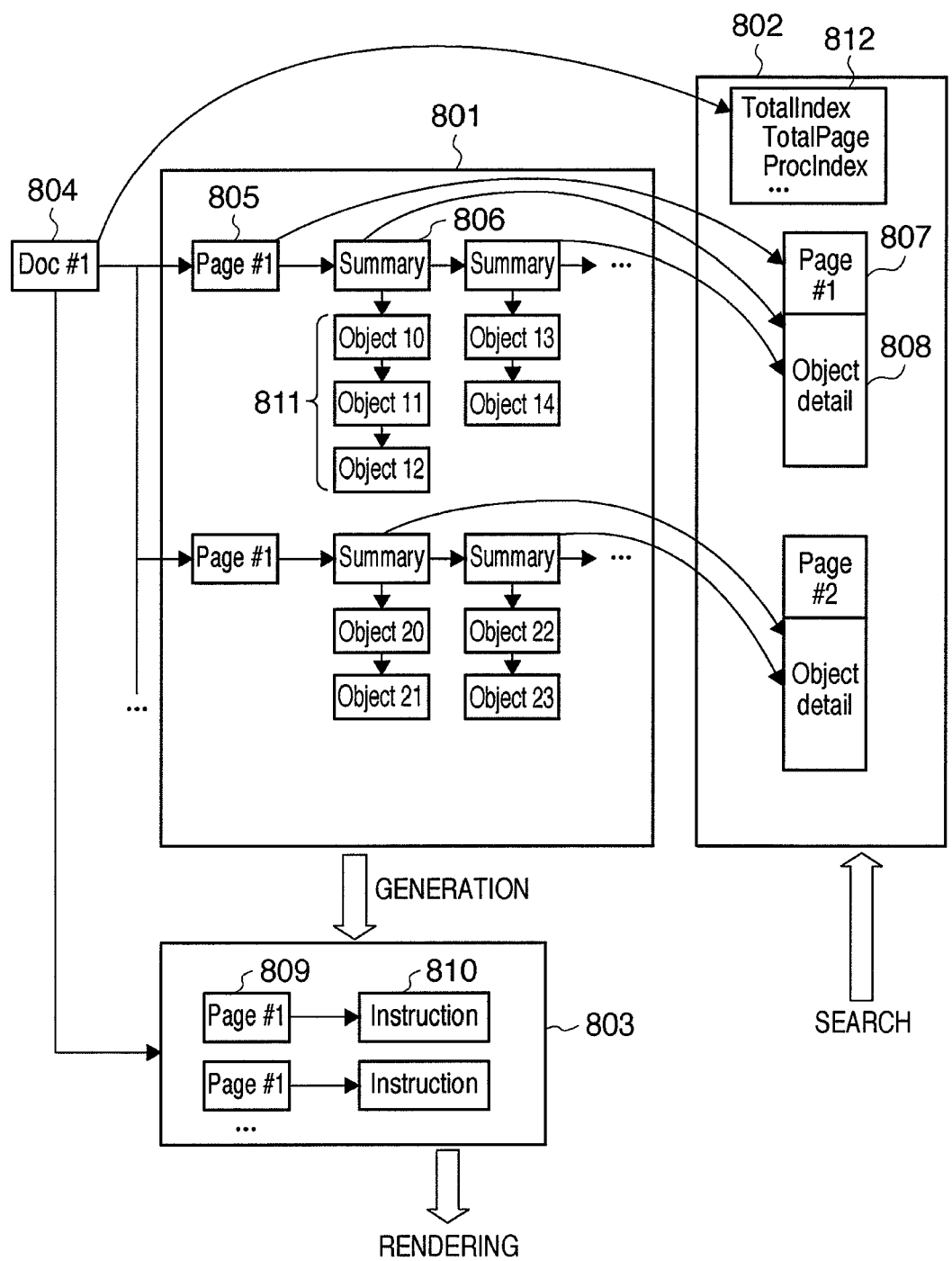
FIG. 8 is a diagram illustrating a data structure of a document.
Figure 9A:
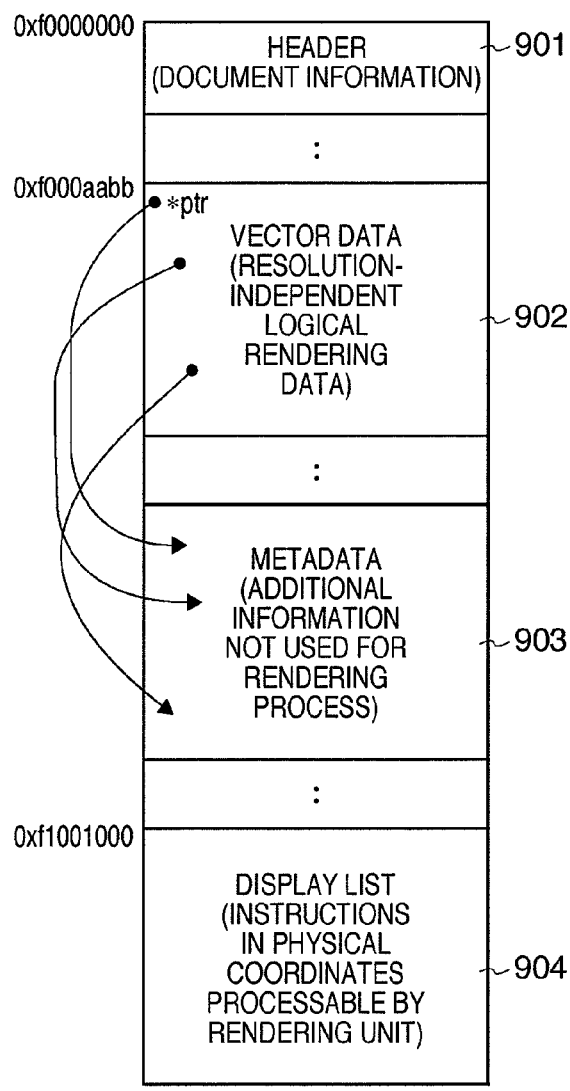
FIGS. 9A and 9B are diagrams showing how the data structure described in FIG. 8 is arranged in a memory or file.
Figure 9B:
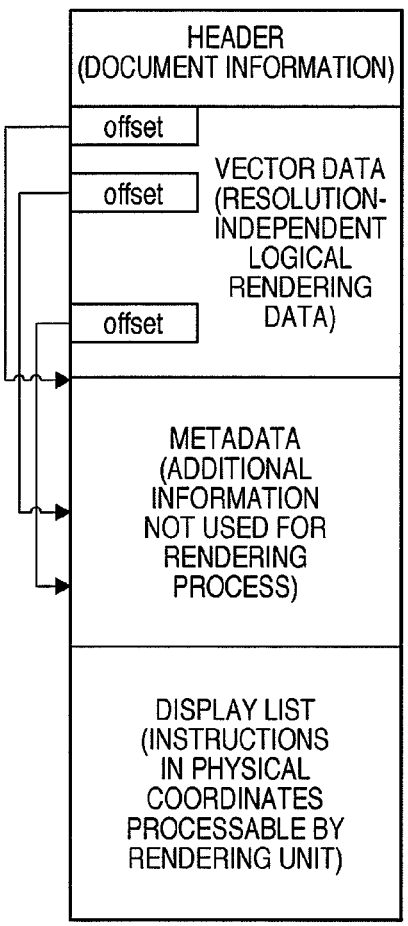
Figure 10:
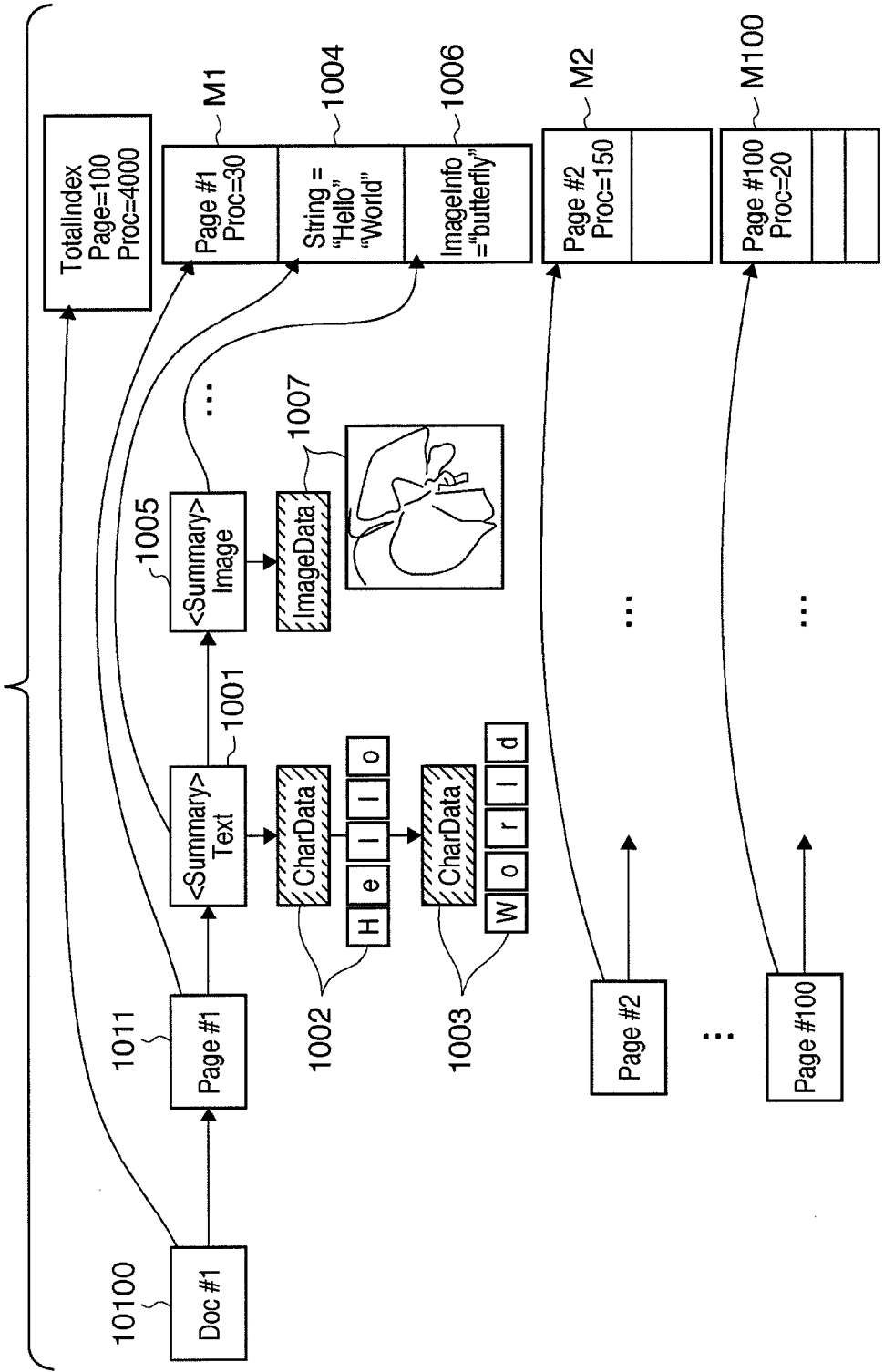
FIG. 10 is a diagram showing a concrete example of 100-page (for example) document data processed according to the present embodiment.

FIGS. 8 to 10 are diagrams showing an exemplary structure of a document processed by the image processing system according to the present embodiment.

FIG. 8 is a diagram illustrating a data structure of a document.

A document, which contains multiple pages of data, is largely made up of vector data 801, metadata 802, and a display list (DL) 803. The document has a hierarchical structure beginning with a document header 804. The vector data 801 further includes page headers 805 for individual pages, summary information 806, and objects 811. The metadata 802 further includes page information 807 and detailed information 808. The DL 803 further includes page headers 809 and instructions 810 for rendering. The document header 804, which describes storage locations of the vector data 801 and DL 803, is associated with the vector data 801 and DL 803 by the document header 804.

Since the vector data 801 is resolution-independent rendering data, layout information about size, orientation, and the like of the page is described in the page header 805. Each object 811 is linked to rendering data of a line, polygon, Bezier curve, or the like. Multiple objects are associated collectively with the summary information 806. The summary information 806 represents the multiple objects collectively and describes attribute information about segmented regions.

The metadata 802, which is additional information not directly relevant to a rendering process, contains information, such as throughput indices and page count, needed to estimate the processing time of the document as well as search information and the like. The page information 807 contains throughput indices needed for rendering of the rendering data contained in the given page. The detailed information 808 describes character strings (character code strings) generated as OCR process results or image information.

The metadata 802 further contains total information 812 in such a way as to allow direct references from the document header 804. Similarly, the page header 805 of each page is associated with the page information 807 so that additional information of the page can be referenced on a page-by-page basis. Also, the metadata 802 is referenced from the summary information 806 of the vector data 801, making it possible to find the detailed information 808 from the summary information 806.

Reference characters DL 803 denote intermediate code converted into bitmap data by the rendering unit. Each page header 809 describes a management table of rendering information (instructions) and the like contained in the given page. Instructions 810 include resolution-dependent rendering information (bitmap images).

FIGS. 9A and 9B are diagrams showing how the data structure described in FIG. 8 is arranged in a memory or file.

Referring to FIG. 9A, a vector data region 902, metadata region 903, and DL region 904 of a document 901 are placed at arbitrary addresses in memory. Thus, the header is read from address "0xf0000000." On the other hand, the vector data is read from address "0xf000aabb." The metadata corresponding to the vector data is associated by a pointer (*ptr).

In FIG. 9B, a vector data region, metadata region, and DL region of a document is serialized in a single file. Thus, the vector data, metadata, and display list are accessed based on offsets from the starting address.

FIG. 10 is a diagram showing a concrete example of 100-page (for example) document data processed according to the present embodiment.

When processing a received document, the image processing apparatus can directly refer to overall information about the metadata from the document header without analyzing contents of image data.

Organization of each page will be described in detail by taking the first page as an example. Summary information on the first page includes "TEXT" and "IMAGE." "TEXT" summary information 1001 is linked with vector data which represents character outlines of H,e,l,l,o (object 1002) and W,o,r,l,d (object 1003). Furthermore, character code strings (metadata 1004) "Hello" and "World" are referenced from the summary information.

"IMAGE" summary information 1005 is linked with a photographic image (JPEG) 1007 of a butterfly. Furthermore, image information (metadata 1006) on "butterfly" is referenced from the summary information 1005. Thus, text in the page can be searched for using a keyword "World" as follows. First, from a document header 10100, page data 1011 of the pages are acquired in sequence. Next, metadata linked to a character region "TEXT" is searched for in the summary information 1001 and 1005 linked to the page header. Then, a page containing the keyword "World" in the metadata is retrieved. Incidentally, M1, M2, . . . , and M100 denote page headers of the pages.

<OCR Process which Involves Scanning and Transfer>

Next, description will be given of a flow of processes: the process of reading an original with the scanning unit 101 and generating a document by performing OCR process and the process of transferring the document to other apparatus and thereby increasing accuracy of OCR process results.

Figure 11:
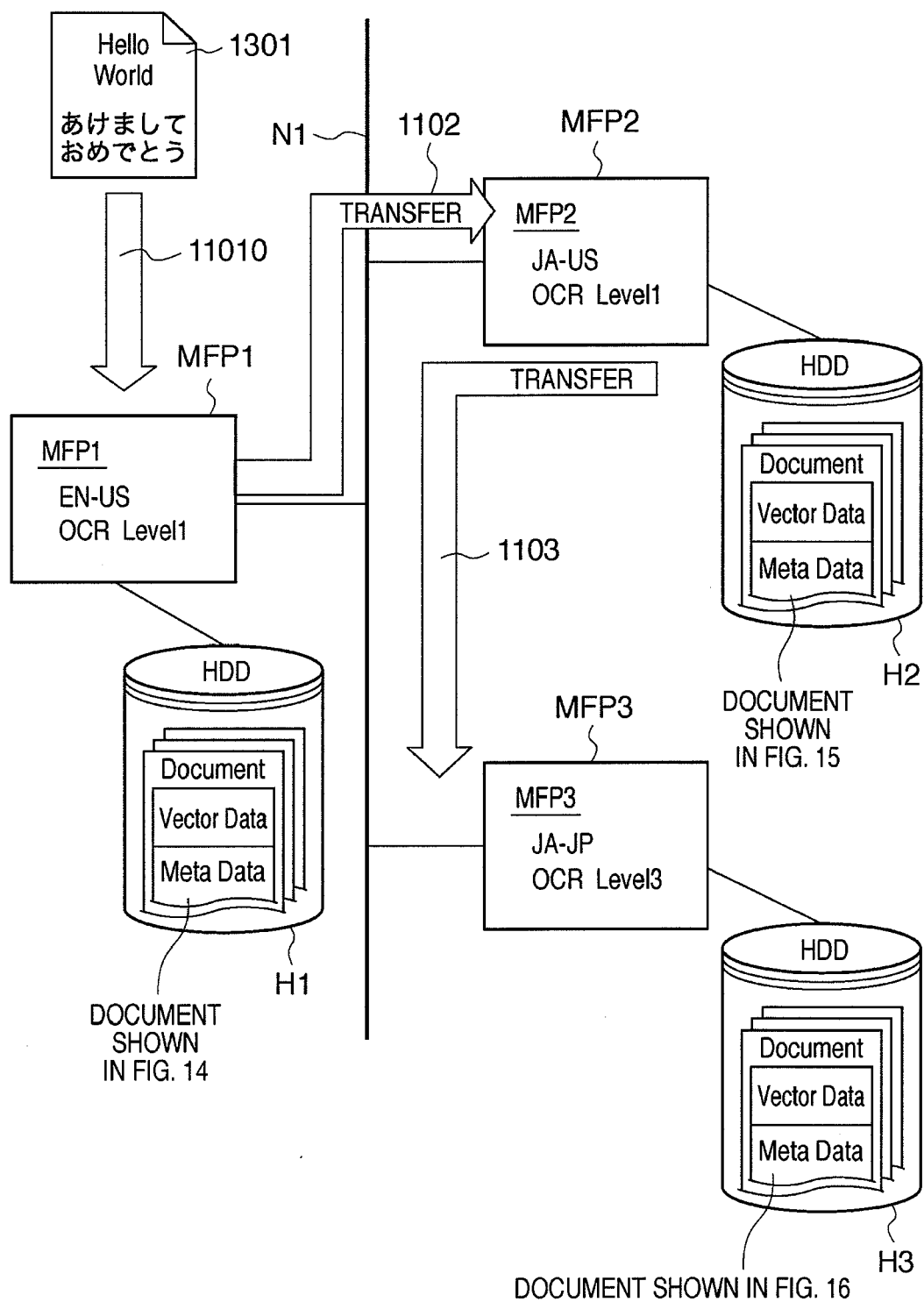
FIG. 11 is a system block diagram showing how documents are transferred among the image processing apparatuses (MFPs) according to the present embodiment.

FIG. 11 is a system block diagram showing how documents are transferred among the image processing apparatuses (MFPs) according to the present embodiment.

Referring to FIG. 11, an original 1301 is scanned by MFP1 which functions as a first image processing apparatus (11010), and then an OCR process and document generation are performed. MFP1 is intended for the English language (EN) and destined for North America (US). MFP1 has OCR performance of Level 1. Next, OCR process results are transmitted (or transferred) as document data from MFP1 to MFP2 (1102). MFP2 is intended for the Japanese language (JA) and destined for North America (US). MFP2 performs an OCR process again. MFP2 has OCR performance (Level 1) equal to MFP1. MFP3, which functions as a second image processing apparatus, is intended for the Japanese language (JA) and destined for Japan (JP). MFP3 has higher OCR performance (Level 3) than the other MFPs. Subsequently, the document is transmitted (or transferred) from MFP2 to MFP3 (1103) for a further OCR process.

First, scanning of an original and a document generation process 11010 performed by MFP1 will be described with reference to FIGS. 12 to 14.

Figure 13:
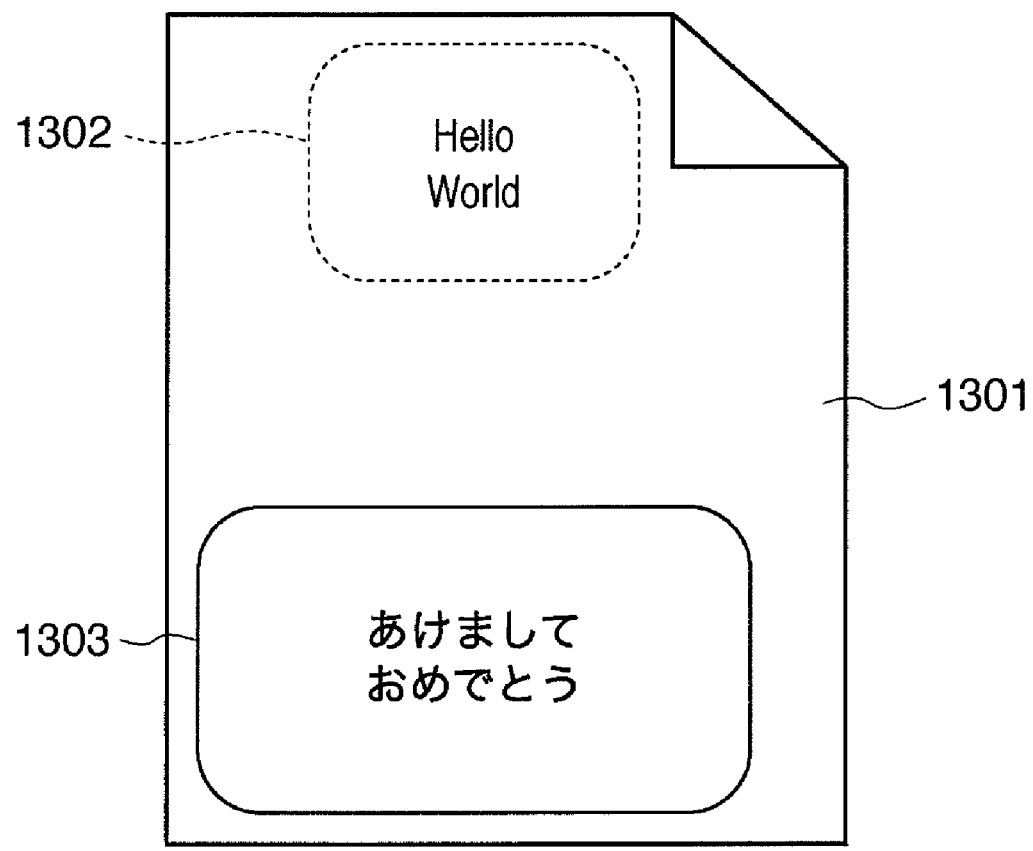
FIG. 13 is a diagram showing an example of an original 1301 to be scanned.

FIG. 13 is a diagram showing an example of an original 1301 to be scanned.

The original 1301 includes an English character region 1302 and Japanese character region 1303.

Next, an OCR process and document generation process will be described with reference to a flowchart in FIG. 12.

FIG. 12 is a flowchart illustrating the process of reading an original, performing an OCR process, and generating a document using the image processing apparatus according to the present embodiment. A program which performs this process is loaded into the RAM 206 from the HDD 208 at runtime and is performed under the control of the CPU 205.

First, in Step S1, when the user places an original on the scanning unit 101 of MFP1 and gives a Scan Start command via the operation unit 210, the original is scanned. In Step S2, a bitmap image scanned by the scanning unit 101 is analyzed and the region segmentation process shown in 601 of FIG. 6 is performed. The original 1301 shown in FIG. 13 includes the character regions 1302 and 1303. In Step S3, the regions 1302 and 1303 are recognized as character regions (TEXT). Next, in Step S4, the CPU 205 which functions as a first character recognition unit performs an OCR process (first character recognition process) on the character region 1302.

MFP1, which is intended for the English language (EN) and destined for North America (US) as described above, can accurately recognize English characters contained in the character region 1302. Next, it is determined in Step S5 that likelihood of recognition errors is not high, and the flow goes to Step S6. In Step S6, vector data (font information and the like) is generated to reproduce characters contained in the original image, and a character string obtained as processing results of the OCR process in Step S4 is added as metadata of the region. The CPU 205 which functions as the first output unit outputs the processing results of the character recognition process.

Figure 14:
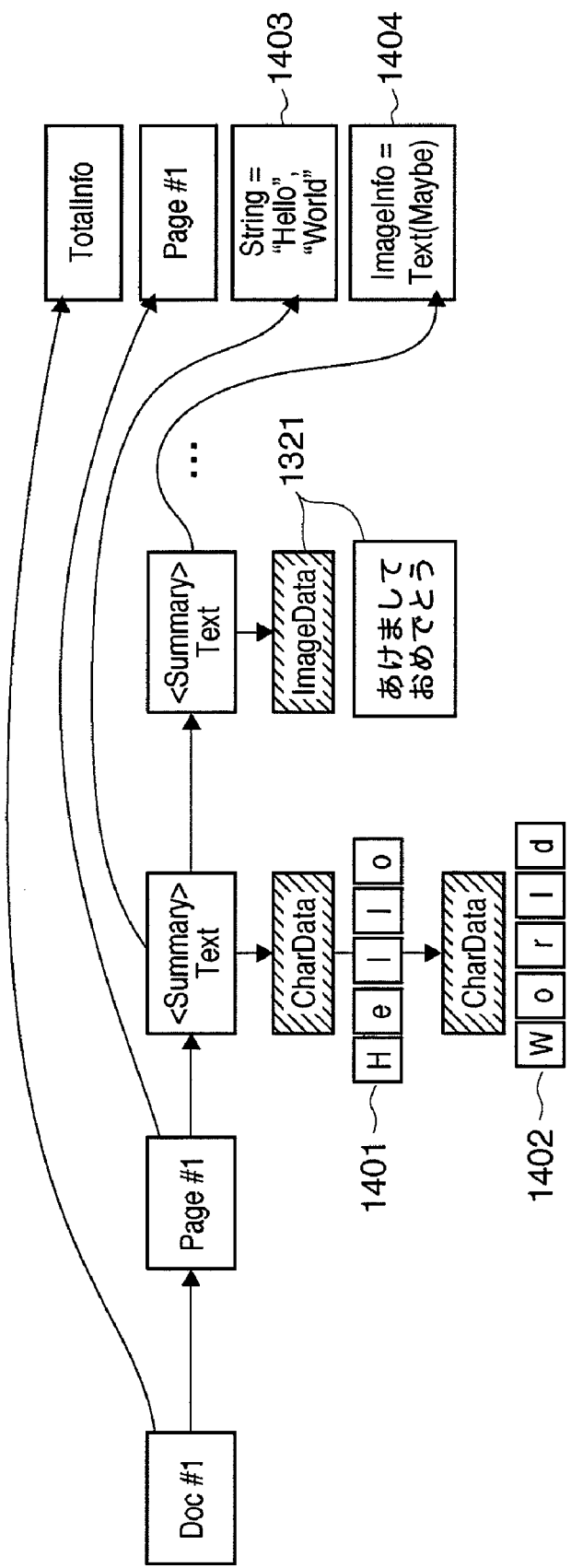
FIG. 14 is a diagram illustrating document data obtained by scanning on MFP1 which is an example of the image processing apparatus according to the present embodiment.

FIG. 14 is a diagram illustrating document data obtained by scanning on MFP1 which is an example of the image processing apparatus according to the present embodiment.

Vector data obtained from the character region 1302 of the original 1301 is denoted by reference numerals 1401 and 1402. On the other hand, reference numeral 1403 denotes metadata.

Next, in Step S7, it is checked whether all the image regions in the page have been processed. If there is any region yet to be processed, the flow returns to Step S3 to repeat the processes described above.

In the example of FIG. 13, since the character region 1303 is yet to be processed, the flow returns to Step S3.

The character region 1303 is recognized in Step S3 as a character (TEXT) region. Next, in Step S4, an OCR process is performed on the character region 1303. The character region 1303 contains Japanese characters. In this case, MFP1, which is incapable of recognizing Japanese characters, cannot recognize the characters correctly. Thus, in Step S5, it is determined that the likelihood of recognition errors is high, and the flow goes to Step S10. In Step S10, it is determined whether to carry out an OCR process in spite of the high likelihood of recognition errors or output the bitmap image as it is instead of processing results of an OCR process. The determination may be made based on a setting specified in MFP1 in advance or a selection made by the user via the operation unit 210.

It is assumed here that the user selects in Step S10 not to carry out an OCR process via the operation unit 210. In this case, the flow goes from Step S10 to Step S11 to output the bitmap image scanned from the character region 1303. Information "ImageInfo=Text(Maybe)" (second information) is added to metadata 1404 of the bitmap image, indicating that the bitmap image may contain characters. The information is used as reference information indicating that characters may be recognized if an OCR process is performed on the character region when the document is processed again by another MFP. The CPU 205 which functions as a second output unit outputs the image data subjected to a character recognition process instead of processing results of a character recognition process.

If it is determined in Step S10 to carry out an OCR process based on an apparatus setting or user selection, the flow goes to Step S12 to carry out an OCR process and thereby generate vector data and metadata as in the case of Step S6. Next, the flow goes to Step S13 to output the metadata by adding information which indicates that the metadata may contain recognition errors (first information). Then, in Step S14, the bitmap image of the character region 1303 is also attached as reference information. The reason why the bitmap image is added is to allow any apparatus to which the document is transferred to perform an OCR process again.

After Steps S11 or S14, the flow goes to Step S7. If it is determined in Step S7 that one page has been processed, the flow goes to Step S8 to determine whether the processed page is the last page. If the processed page is not the last page, the flow returns to Step S1 to read the next page of the original. When it is determined in Step S8 that the processed page is the last page, the flow goes to Step S9, where generation of the document data shown in FIG. 13 is completed and the document data is stored in the hard disk 208 (FIG. 3) to finish the process.

Referring to FIG. 11, description will be given of how the document data generated by scanning on MFP1 (in FIG. 13) is transmitted (or transferred) to MFP2 (transfer (1102) in FIG. 11) and an OCR process is performed by MFP2 anew.

Figure 15:
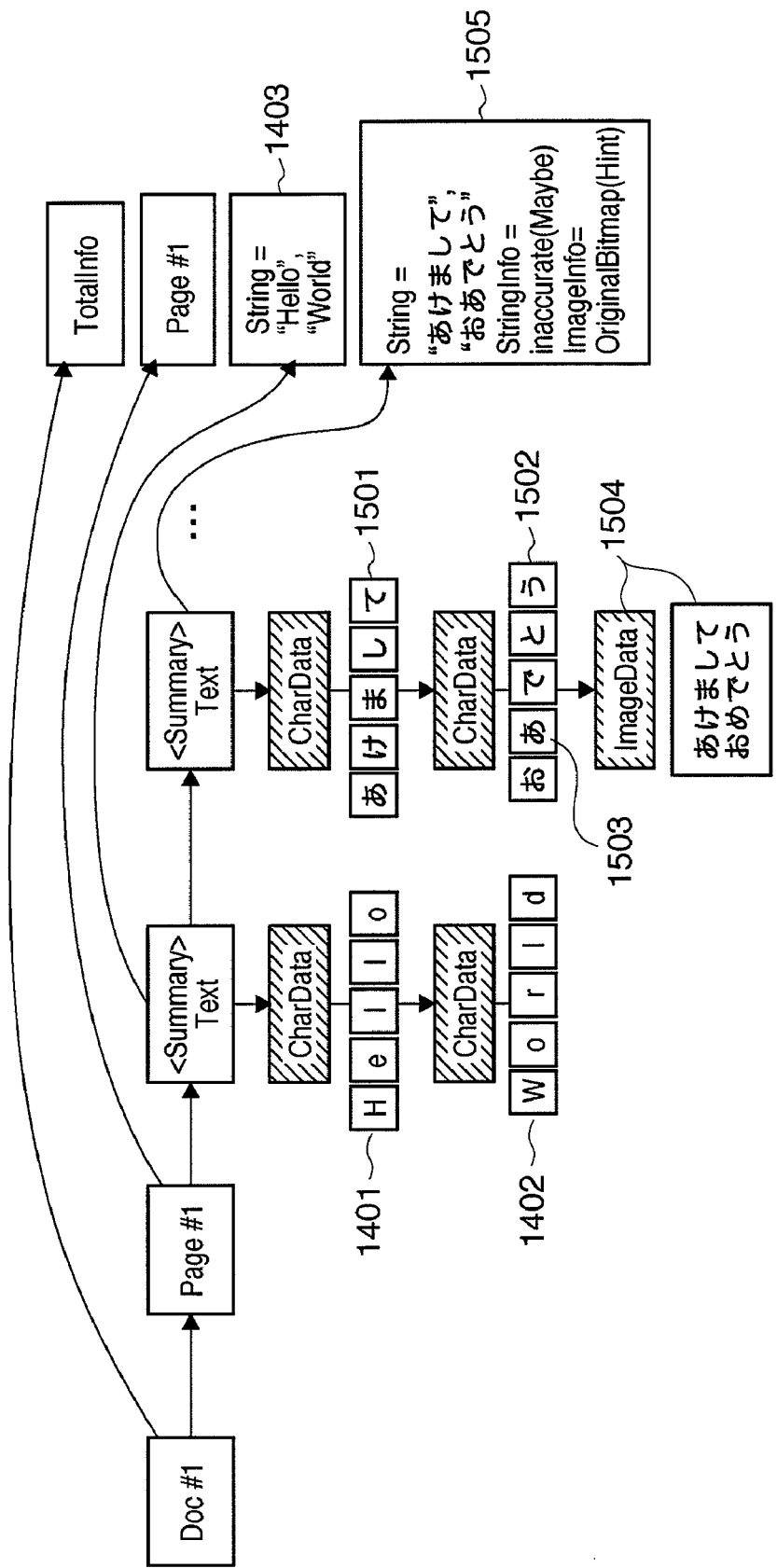
FIG. 15 is a diagram showing an example of vector data and metadata obtained through an OCR process performed by MFP2 according to the present embodiment.

FIG. 15 is a diagram showing an example of document data generated and stored by MFP2 by performing an OCR process anew on document data received from MFP1, wherein the same parts as those in FIG. 14 are denoted by the same reference numerals as the corresponding parts in FIG. 14.

Vector data obtained as a result of an OCR process performed on a Japanese character region is denoted by 1501 and 1502. In the character string in 1502, the character indicated by 1503 is obtained as a result of recognition errors. Thus, an original bitmap image 1504 of the character region is attached as reference information. Reference numeral 1505 denotes metadata which contains vector data of the recognized character and information indicating that the image is provided as reference information.

Figure 17:
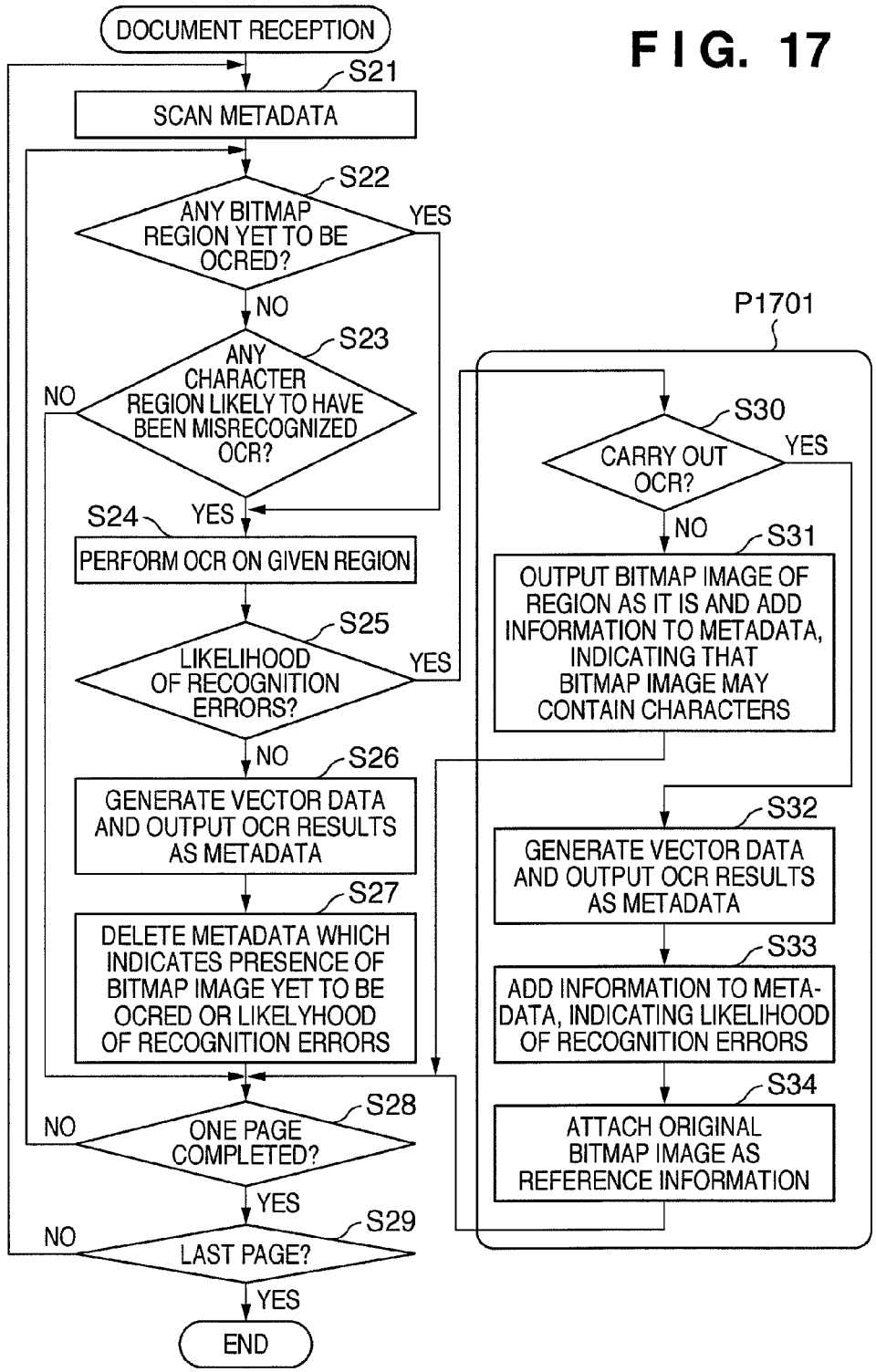
FIG. 17 is a flowchart illustrating a process in which the image processing apparatus according to the present embodiment performs an OCR process on document data transferred from another image processing apparatus.

FIG. 17 is a flowchart illustrating a process in which the image processing apparatus according to the present embodiment performs an OCR process on document data transferred from another image processing apparatus. A program which performs this process is loaded into the RAM 206 from the HDD 208 at runtime and is performed under the control of the CPU 205.

The process is started when document data transmitted from MFP1 is received by MFP2 via the LAN 10. The document data to be received by MFP2 may be transmitted from MFP1 (Push type) or transferred from MFP2 in response to a transmission request from MFP1 (Pull type). Alternatively, the process may be started based on an operation command given to MFP1 or MFP2 from another apparatus (e.g., a personal computer not shown) connected to the LAN 10.

Upon receiving the document data, in Step S21, MFP2 searches the document data for the metadata 1403 and 1505 and checks whether the document data contains an image to be OCRed. In Steps S22 and S23, it is determined whether there is any bitmap image yet to be OCRed or whether there are OCR process results which are likely to contain recognition errors. If appropriate data is detected in Step S22 or S23, the flow goes to Step S24 where the CPU 205 which functions as the second character recognition unit performs an OCR process (second character recognition process) on the bitmap image contained in the document data. In Step S25, it is determined whether the character recognition has been successful. If the character recognition has been successful, the flow goes to Step S26 to generate vector data and convert the OCR process results into metadata. Next, the flow goes to Step S27 to erase that part of the acquired metadata which indicates the presence of a bitmap image yet to be OCRed or the likelihood of recognition errors. On the other hand, if it is determined in Steps S22 and S23 that there is no bitmap image yet to be OCRed and that there are no OCR process results which are likely to contain recognition errors, the flow goes to Step S28.

According to the present embodiment, it is assumed that although MFP2 is designed to recognize the Japanese language, MFP2 cannot recognize the Japanese character region 1303 contained in the document data because of low OCR performance (Level 1). In this case, it is determined in Step S25 that recognition errors are likely to be contained, and the flow goes to Step S30. In Step S30, it is determined whether to carry out an OCR process. A series of processes boxed in P1701 in FIG. 17 is the same as the processes boxed in P1201 in FIG. 12 which shows a process flow for scanning. Thus, the determination as to whether to carry out an OCR process in Step S30 may be made based on a setting specified in MFP2 in advance or a selection made by the user via the operation unit 210 (user interface) as in the case of Step S10 in FIG. 12.

It is assumed here that the user specifies an OCR process to be carried out by MFP2. Consequently, the flow goes to Step S32. In Steps S32 and S33, an OCR process is performed, and OCR results and likelihood of recognition errors are generated as the metadata 1505 shown in FIG. 15. Furthermore, in Step S34, the original bitmap image 1504 is attached as reference information to the metadata. Consequently, information indicating that the image is provided as reference information is added to the metadata 1505.

After any of Steps S27, S31, and S34 is carried out, the flow goes to Step S28 to determine whether one page has been processed. If it is determined that one page has been processed, the flow goes to Step S29 to determine whether the processed page is the last page. If the processed page is not the last page, the flow returns to Step S21 to scan next metadata. When it is determined in Step S29 that the processed page is the last page, the document data shown in FIG. 15 is stored in the hard disk 208 (H2), and the process is finished.

FIG. 15 shows the vector data 1501 and 1502 and metadata 1505 obtained as a result of OCR.

If metadata is generated by an MFP, such as MFP2, which has low OCR performance and produces OCR results likely to contain recognition errors, the metadata in turn may produce wrong search results. Thus, the metadata generated by such an MFP is not used in document searches using the metadata according to the present embodiment. That is, the character string contained in the character region 1303 of the original cannot be used to search for the document generated by MFP2 and shown in FIG. 15.

Now, description will be given of how the document shown in FIG. 15 is transferred to MFP3 with higher OCR performance and OCRed accurately.

The document data transferred from MFP2 to MFP3 is processed by MFP3 as in the case of the document data transfer from MFP1 to MFP2 described above. A resulting flow of processes is the same as in the flowchart of FIG. 17.

Thus, MFP3 receives and processes the document data (shown in FIG. 15) once processed by MFP2. As described above, MFP3 is intended for the Japanese language and destined for Japan. Furthermore, MFP3 has higher OCR performance (Level 3) than MFP1 and MFP2. Consequently, MFP3 can correctly recognize characters in the character region 1303 of the original 1301 which MFP2 cannot recognize correctly. Therefore, in Step S25 in FIG. 17, it is determined that the characters in the region are recognized correctly and that the likelihood of OCR process results containing recognition errors is low, and the flow goes to Step S26. In Step S26, characters are vectorized and metadata is generated using OCR results produced in Step S24. Next, the flow goes to Step S27 to delete the metadata added to the metadata of the character region 1303, indicating that there is a likelihood of recognition errors and that the bitmap image is added as a reference, as well as to delete the bitmap image provided as a reference.

Figure 16:
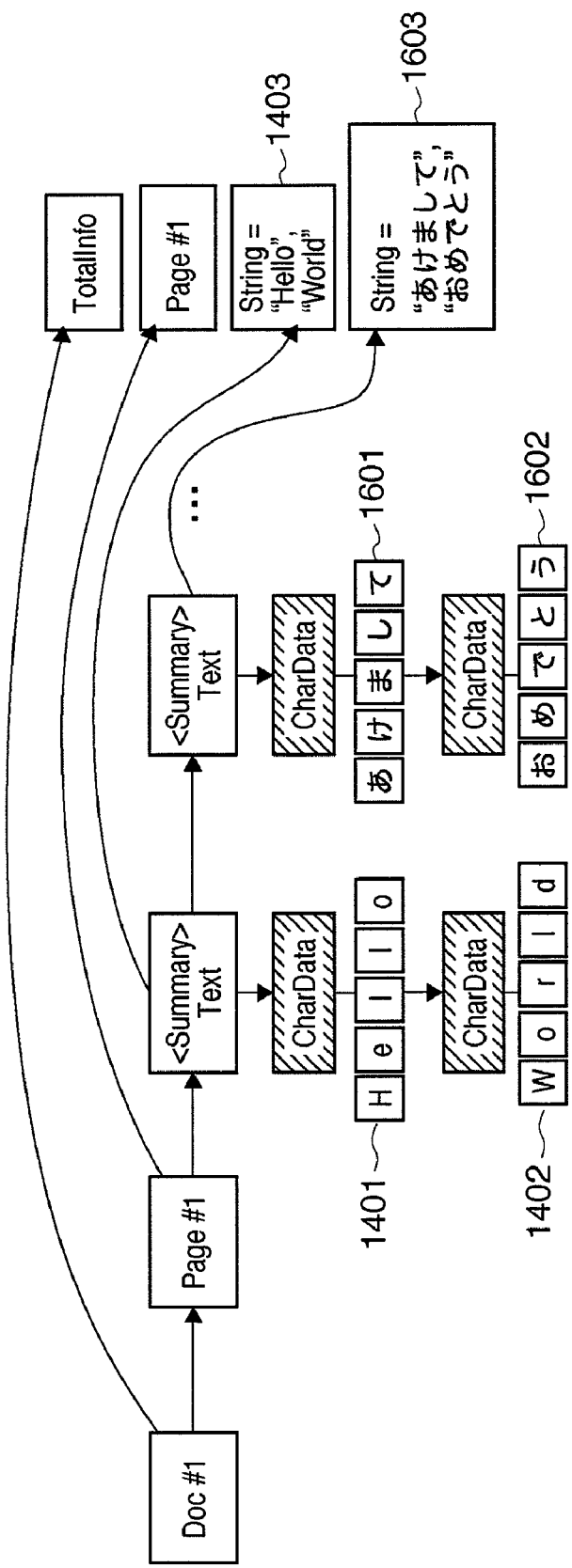
FIG. 16 is a diagram showing an example of document data generated by MFP2 according to the present embodiment.

FIG. 16 is a diagram showing an example of final document data generated by MFP3, wherein the same parts as those in FIGS. 14 and 15 are denoted by the same reference numerals as the corresponding parts in FIG. 16.

In FIG. 16, the characters in the character region 1303 of the original 1301 which could not be recognized correctly by MFP1 and MFP2 in FIGS. 14 and 15 are recognized correctly and vector data 1601 and 1602 and metadata 1603 are generated properly. Consequently, the character region 1303 of the document data processed by MFP1 and MFP2 can be searched accurately using the metadata of the document.

As described above, even when an MFP cannot provide appropriate OCR process results, the present embodiment makes it possible to obtain more appropriate OCR process results by transmitting the document data and processing it using MFP3 with higher OCR capabilities.

Incidentally, the present invention can also be achieved by a configuration in which a software program that implements the functions of the embodiment described above is supplied to a system or apparatus either directly or remotely and a computer in the system or apparatus reads out and performs the supplied program. In that case, the present invention does not need to take the form of a program as long as it has program functions.

Thus, program code itself installed on the computer to implement functions and processes of the present invention on the computer also implements the present invention. That is, the computer program itself which implements the functions and processes of the present invention is also included in the scope of the present invention as set forth in the appended claims. In that case, the program code may take any form including object code, programs performed by an interpreter, and script data supplied to an OS as long as it has program functions.

Examples of a recording medium used to supply the program include, a floppy (registered trademark) disk, hard disk, optical disk, magneto-optical (MO) disk, MO, CD-ROM, CD-R, CD-RW, magnetic tape, non-volatile memory card, ROM, and DVD (DVD-ROM and DVD-R).

Besides, the program can also be supplied via an Internet homepage. In that case, the user is supposed to connect to the Internet homepage using a browser on a client computer and download the computer program of the present invention from the homepage onto a recording medium such as a hard disk. The computer program may be downloaded as it is or as a compressed self-installing file. Also, the program code of the program according to the present invention may be divided into multiple files, which can be downloaded from respective homepages.

The present invention may also be distributed to users as a storage medium such as a CD-ROM containing the program of the present invention in encrypted form. In that case, only the users who satisfy predetermined conditions are provided with key information for decryption through a download from an Internet homepage and allowed to decrypt and install the program in executable form on a computer using the key information.

The functions of the above embodiment may be implemented not only by the program read out and performed by the computer, but also in conjunction with an OS or the like running on the computer. In that case, for example, the functions of the above embodiment are implemented by part or all of the actual processing performed by the OS or the like on the computer in accordance with instructions from the program.

Furthermore, the functions of the above embodiment may also be implemented by part or all of the actual processing performed by a CPU or the like contained in a function expansion board inserted in the computer or a function expansion unit connected to the computer if the processing is performed in accordance with instructions from the program that has been read out of the recording medium and written into memory on the function expansion board or unit.

The present invention enables realization of a technique in which when results of a character recognition process performed by one image processing apparatus are highly likely to contain recognition errors, a character recognition process can be performed by another image processing apparatus with higher character recognition ability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-021646 filed on Jan. 31, 2008, which is hereby incorporated by reference herein in its entirety.

The invention claimed is:

1. An image processing apparatus comprising:
a character recognition unit configured to perform a character recognition process on a character region contained in an image;
a receiving unit configured to receive an image containing a character region and processing results of a character recognition process performed on the character region from an external apparatus;
a determination unit configured to determine, based on the received processing results, whether a character recognition process needs to be performed on the character region of the received image using said character recognition unit, wherein said determination unit determines that the character recognition process needs to be performed on the character region of the received image using said character recognition unit if information indicating a high likelihood of the processing results containing recognition errors is attached to the received processing results;
a judging unit configured to judge whether a likelihood that recognition errors are contained in the processing results of the character recognition process performed by said character recognition unit is high;
an erasing unit configured to erase the information indicating a high likelihood of the processing results containing recognition errors if it is judged by said judging unit that likelihood that recognition errors are contained in the processing results of the character recognition process performed by said character recognition unit is not high; and
a control unit configured to make said character recognition unit perform a character recognition process on the character region of the received image if said determination unit determines that a character recognition process needs to be performed on the character region of the received image using said character recognition unit.

2. The image processing apparatus according to claim 1, further comprising an output unit configured to output processing results of the character recognition process performed by said character recognition unit instead of the received processing results when said character recognition unit performs the character recognition process on the character region of the received image.

3. The image processing apparatus according to claim 1, wherein said receiving unit receives the processing results attached as additional information on the image.

4. The image processing apparatus according to claim 1, wherein the information indicating a high likelihood of the received processing results containing recognition errors is attached by the external apparatus.

5. The image processing apparatus according to claim 1, further comprising:
   an attaching unit configured to attach the information indicating a high likelihood of the processing results containing recognition errors to the processing results of the character recognition process performed by said character recognition unit if it is judged by said judging unit that likelihood that recognition errors are contained in the processing results of the character recognition process performed by said character recognition unit is high.

6. A control method for an image processing apparatus, comprising:
   performing, by a character recognition unit, a character recognition process on a character region contained in an image;
   receiving an image containing a character region and processing results of a character recognition process performed on the character region from an external apparatus;
   determining, based on the received processing results, whether a character recognition process needs to be performed on the character region of the received image using said character recognition unit, wherein it is determined that the character recognition process needs to be performed on the character region of the received image using said character recognition unit if information indicating a high likelihood of the processing results containing recognition errors is attached to the received processing results;
   judging whether a likelihood that recognition errors are contained in the processing results of the character recognition process performed by said character recognition unit is high;
   erasing the information indicating a high likelihood of the processing results containing recognition errors if it is judged that likelihood that recognition errors are contained in the processing results of the character recognition process performed by said character recognition unit is not high; and
   making said character recognition unit perform a character recognition process on the character region of the received image if it is determined that a character recognition process needs to be performed on the character region of the received image using said character recognition unit.

7. A computer-readable recording medium storing a computer program which makes a computer perform the control method for an image processing apparatus according to claim 6.

* * * * *